US010663335B2

(12) United States Patent
Casey

(10) Patent No.: US 10,663,335 B2
(45) Date of Patent: May 26, 2020

(54) HYGIENIC MANIFOLD FOR A FLOW METER

(71) Applicant: Micro Motion, Inc., Boulder, CO (US)

(72) Inventor: Megan Casey, Boulder, CO (US)

(73) Assignee: Micro Motion, Inc., Boulder, CO (US)

(*) Notice: Subject to any disclaimer, the term of this patent is extended or adjusted under 35 U.S.C. 154(b) by 232 days.

(21) Appl. No.: 15/754,936

(22) PCT Filed: Sep. 15, 2015

(86) PCT No.: PCT/US2015/050192
§ 371 (c)(1),
(2) Date: Feb. 23, 2018

(87) PCT Pub. No.: WO2017/048235
PCT Pub. Date: Mar. 23, 2017

(65) Prior Publication Data
US 2019/0063975 A1 Feb. 28, 2019

(51) Int. Cl.
*G01F 1/84* (2006.01)
*G01F 15/18* (2006.01)

(52) U.S. Cl.
CPC ............ *G01F 1/8409* (2013.01); *G01F 15/18* (2013.01); *G01F 15/185* (2013.01)

(58) Field of Classification Search
CPC ....... G01F 15/18; G01F 15/185; G01F 1/8409
See application file for complete search history.

(56) References Cited

U.S. PATENT DOCUMENTS 4,109,619 A * 8/1978 Morris .................. F02M 29/04
123/184.56
4,879,910 A * 11/1989 Lew ......................... G01F 1/78
73/861.355

(Continued)

FOREIGN PATENT DOCUMENTS

EP 0212782 A1 3/1987
EP 2657659 A1 10/2013

(Continued)

*Primary Examiner* — Francis C Gray
(74) *Attorney, Agent, or Firm* — The Ollila Law Group LLC

(57) ABSTRACT

A manifold (100) of a flowmeter (5) includes a body (120) having a first face (104) with a first orifice (108) and a second orifice (110) and an opposing second face (204) with a third orifice (114) and a fourth orifice (116), wherein the first orifice (108) and third orifice (114) each extend into the body (120) and meet to define a first flow path (170) traversing the body (120), and wherein the second orifice (110) and fourth orifice (116) each extend into the body (120) and meet to define a second flow path (180) traversing the body (120), wherein the third orifice (114) and fourth orifice (116) are each adapted to fluidly communicate with a first and second flow tube (13, 13') of the flowmeter (5), respectively; and a non-circular bifurcated flow opening (112), said non-circular bifurcated flow opening (112) including a non-circular wall portion (106, 106') projecting from said first face (104) and surrounding the first orifice (108) and second orifice (110), wherein said non-circular wall portion (106, 106') is configured to change a cross section of a fluid flow path exiting said first orifice (108) and said second orifice (110).

18 Claims, 7 Drawing Sheets

(56) References Cited

U.S. PATENT DOCUMENTS

| | | | |
|---|---|---|---|
| 6,308,580 B1* | 10/2001 | Crisfield | G01F 1/8409 |
| | | | 73/861.355 |
| 6,450,042 B1* | 9/2002 | Lanham | B29C 33/52 |
| | | | 73/861.357 |
| 6,523,421 B1 | 2/2003 | Tanner et al. | |
| 2002/0157479 A1* | 10/2002 | Crisfield | G01F 1/8409 |
| | | | 73/861.355 |
| 2011/0154812 A1 | 6/2011 | Butler | |
| 2012/0279317 A1* | 11/2012 | Bitto | G01F 1/8418 |
| | | | 73/861.355 |
| 2013/0112009 A1* | 5/2013 | Mokady | G01F 1/8409 |
| | | | 73/861.354 |
| 2015/0027236 A1* | 1/2015 | Yoder | G01F 1/76 |
| | | | 73/861.357 |
| 2015/0033874 A1* | 2/2015 | Wang | G01F 1/8409 |
| | | | 73/861.355 |
| 2015/0192447 A1* | 7/2015 | Lanham | G01F 1/8409 |
| | | | 73/431 |
| 2017/0089744 A1* | 3/2017 | Phatak | G01F 1/8409 |

FOREIGN PATENT DOCUMENTS

| | | |
|---|---|---|
| WO | 198801370 A2 | 2/1988 |
| WO | 200165213 A1 | 9/2001 |

\* cited by examiner

HYGIENIC MANIFOLD FOR A FLOW METER

FIELD OF THE INVENTION

The embodiments described below relate to vibrating meters, and more particularly, to an improved hygienic intake and outlet manifold for a compact flow meter.

BACKGROUND

Vibrating flowmeters or conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the conduit and the material contained therein.

Material flows into the flow meter from a connected pipeline on the inlet side of the vibrating meter. The material is then directed through the fluid tube or fluid tubes and exits the flow meter to a pipeline connected on the outlet side.

A driver, such as a voice-coil style driver, applies a force to the one or more fluid tubes. The force causes the one or more fluid tubes to oscillate. When there is no material flowing through the flow meter, all points along a fluid tube oscillate with an identical phase. As a material begins to flow through the fluid tubes, Coriolis accelerations cause each point along the fluid tubes to have a different phase with respect to other points along the fluid tubes. The phase on the inlet side of the fluid tube lags the driver, while the phase on the outlet side leads the driver. Sensors are placed at two different points on the fluid tube to produce sinusoidal signals representative of the motion of the fluid tube at the two points. A phase difference of the two signals received from the sensors is calculated in units of time.

The phase difference between the two sensor signals is proportional to the mass flow rate of the material flowing through the fluid tube or fluid tubes. The mass flow rate of the material is determined by multiplying the phase difference by a flow calibration factor. The flow calibration factor is dependent upon material properties and cross sectional properties of the fluid tube. One of the major characteristics of the fluid tube that affects the flow calibration factor is the fluid tube's stiffness. Prior to installation of the flow meter into a pipeline, the flow calibration factor is determined by a calibration process. In the calibration process, a fluid is passed through the fluid tube at a given flow rate and the proportion between the phase difference and the flow rate is calculated. The fluid tube's stiffness and damping characteristics are also determined during the calibration process as is generally known in the art.

One advantage of a Coriolis flow meter is that the accuracy of the measured mass flow rate is not affected by wear of moving components in the flow meter, as there are no moving components in the vibrating fluid tube. The flow rate is determined by multiplying the phase difference between two points on the fluid tube and the flow calibration factor. The only input is the sinusoidal signals from the sensors indicating the oscillation of two points on the fluid tube. The phase difference is calculated from the sinusoidal signals. Since the flow calibration factor is proportional to the material and cross sectional properties of the fluid tube, the phase difference measurement and the flow calibration factor are not affected by wear of moving components in the flow meter.

A typical Coriolis mass flowmeter includes one or more transducers (or pickoff sensors), which are typically employed in order to measure a vibrational response of the flow conduit or conduits, and are typically located at positions upstream and downstream of the actuator. The pickoff sensors are connected to electronic instrumentation. The instrumentation receives signals from the two pickoff sensors and processes the signals in order to derive a mass flow rate measurement, among other things.

Typical Coriolis flow meters measure flow and/or density through the use of a coil and magnet as a pickoff sensor to measure the motion of a meter's vibrating flow tube/tubes. The mass flow rate through the meter is determined from the phase difference between multiple pickoff signals located near the inlet and outlet of the meter's flow tubes. However, it is possible to measure flow using strain gages in place of coil/magnet sensors. A fundamental difference between the two sensor types is that coil/magnet sensors measure the velocity of the flow tubes and strain gages measure the strain of the flow tubes.

Typically manifolds provide the inlet and outlet path for material entry and exit through the flow tubes, and these are generally coupled to flanges that attach to exterior conduits. The manifolds are coupled to the flow tubes and also case portions. In many situations, a portion of the fluid tubes extend out of the case and are joined to a pipeline interface, such as a manifold. The fluid tubes are generally joined to the manifold by welding.

Flow meters also are utilized in specialized applications, for example, high pressure, cryogenic and hygienic systems. Cleaning-In-Place (CIP) and Sterilization-In-Place (SIP) systems are systems designed for automatic cleaning and disinfecting without major disassembly and assembly work. The cleaning can be carried out with automated or manual systems and is a reliable and repeatable process that meets the stringent hygiene regulations demanded by the food, dairy, biotechnology and pharmaceutical industries. CIP and SIP is critical to many industries including food, dairy, beverage, nutraceutical, biotechnology, pharmaceutical, cosmetic, health and personal care industries in which the processing must take place in a hygienic or aseptic environment. Food processing equipment often needs to be cleaned between each lot of product processed through the equipment. However, the tanks, pumps, valves, and piping can be difficult to clean because the various components may be difficult to access and disassemble for cleaning Because of these cleaning difficulties, many food processing plants now use Clean-In-Place systems in which the tanks, pumps, valves, and piping of the food processing equipment remain physically assembled, and various cleaning, disinfecting, and rinsing solutions are circulated by the Clean-In-Place system, at high velocities, through the food processing equipment to affect the cleaning process.

During a CIP process, a cleaning fluid is run through the process line at high velocities in order to clean the process line. The flow rate for a CIP process is determined by the largest area present in the line, which then corresponds to the area with the least velocity. A minimum velocity for a CIP process can be set by the relevant industry standard, but generally, a minimum velocity of 5 ft/second is recommended in order to achieve effective cleaning results (see for example, guidelines for EHEDG (European Hygienic Engineering & Design Group)).

For CIP applications, it is desirable to use a flow meter system that is compact in size. The line sizes for the compact flow meters used for hygienic applications, including in CIP systems, necessarily must be smaller in order to be compatible with the compact flow meter and cases. Typically tubes can be welded to the manifold from the face of a manifold to allow for the tubes to be closer together in the case. In current hygienic flow meters having less than a 3 inch line size, the tubes are welded on the backside of the manifolds, which requires the tubes to be separated further to allow access for welding. This separation of tubes also leads to individual cases for each size tube. For example, when using 9 lines, three cases are employed with three line sizes each using the same case.

In hygienic applications, the lines used with the flow meters typically are of various sizes that are considered to be in the "hygienic range". Arrangement of multiple lines having different sizes on the cases leads to manifold areas being excessively large when compared to the line sizes in which the flow meters are used, resulting in flow velocity that falls below the CIP required flow velocity of 5 ft/sec.

The embodiments described below overcome these and other problems and an advance in the art is achieved. The embodiments described below provide a hygienic manifold for a compact flowmeter that addresses the issue of increased area of the manifold and simultaneously maintains a compact tube design and cases for use in a CIP system.

SUMMARY OF THE INVENTION

The present invention provides a solution to the above-stated problem by providing a manifold with a smaller flow area while still maintaining the compactness of the tubes in the case.

As shown in Table 1, using the manifold area and each sensor's flow rate, the velocity through the manifold was calculated and found to be well below the CIP limit of 5 ft/sec at the sensor's nominal flow rate for four of the six sizes of pipes used with the flowmeters.

TABLE 1

Original manifold areas and velocities

| Line size—diameter (in) | Nominal Flow Rate (lb/min) | Process Connection Area (in$^2$) | Manifold Entry Area (in$^2$) | Velocity of Water (ft/sec) |
| --- | --- | --- | --- | --- |
| ½ | 38.5 | 0.0175 | 2.4411 | 0.6 |
| ¾ | 85 | 0.3019 | 2.4411 | 1.3 |
| ¾ | 125 | 0.3019 | 2.4411 | 2.0 |
| 1 | 230 | 0.5945 | 3.5766 | 2.5 |
| 1.5 | 475 | 1.4741 | 3.5766 | 5.0 |
| 2 | 990 | 2.7464 | 3.5766 | 11 |

As illustrated by Table 1 and Table 2 (below), the solution for providing a manifold with a smaller flow area while maintaining the compactness of the tubes in the case resulted by reducing the area around the flow tubes by changing the cross section into a non-circular configuration. Because the distance and spacing between the flow tubes 13, 13' inside the case was already determined, with regard to the manifold, the only dimension that could be changed was the vertical dimension, resulting in a vertically compressed (or "squashed") flow path. This flow path retains the hygienic flow splitter and contour of the manifold, as well as a hygienic condition of the manifold, by maintaining drainability reuqirements. The area of the manifold is therefore greatly reduced, thus enabling CIP applications at a larger range of flow rates.

TABLE 2

New manifold areas and velocities

| Line size—diameter (in) | Nominal Flow Rate (lb/min) | Process Connection Area (in$^2$) | Manifold Entry Area (in$^2$) | Velocity of Water (ft/sec) |
| --- | --- | --- | --- | --- |
| ½ | 38.5 | 0.1075 | 0.18 | 8.2 |
| ¾ | 85 | 0.3019 | 0.54 | 6.1 |
| ¾ | 125 | 0.3019 | 0.54 | 6.1 |
| 1 | 230 | 0.5945 | 1.14 | 7.8 |

Table 2 shows the areas and corresponding velocities for the four tubes that provided insufficient velocity for a CIP application with the original manifold design. Results indicated that the four tubes that previously provided insufficient velocity for cleaning-in-place systems now provided a velocity well over the minimum 5 ft/sec recommended and/or required for CIP systems with the manifold according to the present application.

According to the invention, the area around the flow tubes is reduced by changing the standard circular cross section into a non-circular shape. Because the spacing between the tubes is determined by the manifold's geometry, the vertical dimension of the flow area around the flow tubes can be altered, resulting in a compressed flow path. This flow path maintains the hygienic flow splitter and contour of the manifold. The manifold is thereby kept in hygienic state by maintaining drainability requirements and the area of the manifold is greatly reduced, thus enabling CIP at a larger range of flow rates.

According to an aspect, a manifold of a flowmeter comprises a body having a first face and an opposing second face. The first face includes a centrally disposed, substantially non-circular wall portion projecting from the first face and surrounding a first orifice and second orifice formed in the first face. Each of the first and second orifices extend into and through the body of the manifold. Third and fourth orifices extend into the body from the opposing second face. The first and third orifices meet to define a fluid passage traversing the body of the manifold; likewise the second and fourth orifices meet to define a second fluid passage traversing through the body. The third and fourth orifices are each configured to be fluidly connected to a flow tube of the flowmeter. The non-circular wall portion is configured so that the cross section of the flow path of the fluid flowing through the body of the manifold and exiting through the first and second orifices is altered, preferably compressed, by the non-circular wall portion and has a greater velocity than if no wall portion were provided.

ASPECTS

In one aspect, a manifold for a flowmeter includes a body having a first face with a first orifice and a second orifice and an opposing second face with a third orifice and a fourth orifice, wherein the first orifice and third orifice each extend into the body and meet to define a first flow path traversing the body, and wherein the second orifice and fourth orifice each extend into the body and meet to define a second flow path traversing the body, wherein the third orifice and fourth orifice are each adapted to fluidly communicate with a first and second flow tube of the flowmeter, respectively; and a non-circular bifurcated flow opening, said non-circular bifurcated flow opening including a non-circular wall portion projecting from said first face and surrounding the first orifice and second orifice, wherein said non-circular wall portion is configured to change a cross section of a fluid flow path exiting said first orifice and said second orifice.

Preferably, the wall portion has an oval cross section.

Preferably, the wall portion has an elongated oval cross section with a constricted peripheral portion.

Preferably, the manifold further includes an adapter element, wherein said adapter element includes a non-circular connection face and an oppositely disposed flow-through opening, wherein said connection face is configured to be concentrically attached to the wall portion.

In one aspect, a manifold of a flowmeter includes a body having a first face with a first orifice and a second orifice and an opposing second face with a third orifice and a fourth orifice, wherein the first orifice and third orifice each extend into the body and meet to define a first flow path traversing the body, and wherein the second orifice and fourth orifice each extend into the body and meet to define a second flow path traversing the body, wherein the third orifice and fourth orifice are each adapted to fluidly communicate with a first and second flow tube of the flowmeter, respectively; a non-circular bifurcated flow opening, said non-circular bifurcated flow opening including a non-circular wall portion projecting from said first face and surrounding the first orifice and second orifice, wherein said non-circular wall portion is configured to change a cross section of a fluid flow path exiting said first orifice and said second orifice; and an adapter element, wherein said adapter element includes a non-circular connection face and an oppositely disposed flow-through opening, wherein said connection face is configured to be concentrically attached to wall portion.

Preferably, the wall portion has an oval cross section.

Preferably, the wall portion has an elongated oval cross section with a constricted peripheral portion.

In one aspect, a manifold of a flowmeter includes a body having a first face with a first orifice and a second orifice and an opposing second face with a third orifice and a fourth orifice, wherein the first orifice and third orifice each extend into the body and meet to define a first flow path traversing the body, and wherein the second orifice and fourth orifice each extend into the body and meet to define a second flow path traversing the body, wherein the third orifice and fourth orifice are each adapted to fluidly communicate with a first and second flow tube of the flowmeter, respectively; and a bifurcated flow opening, said bifurcated flow opening including a wall portion projecting from said first face and surrounding the first orifice and second orifice, wherein said wall portion has an elongated oval shape with a constricted peripheral portion, and wherein said wall portion is configured to change a cross section of a fluid flow path exiting said first orifice and said second orifice.

Preferably, the manifold further comprises an adapter element, wherein said adapter element includes a connection face having an elongated oval shape with a peripheral constricted region and an oppositely disposed flow-through opening, wherein said connection face is configured to be attached to wall portion.

BRIEF DESCRIPTION OF THE DRAWINGS

The same reference number represents the same element on all drawings. The drawings are not necessarily to scale.

DETAILED DESCRIPTION OF THE INVENTION

FIGS. 1-5B and the following description depict specific examples to teach those skilled in the art how to make and use the best mode of embodiments of a flowmeter and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
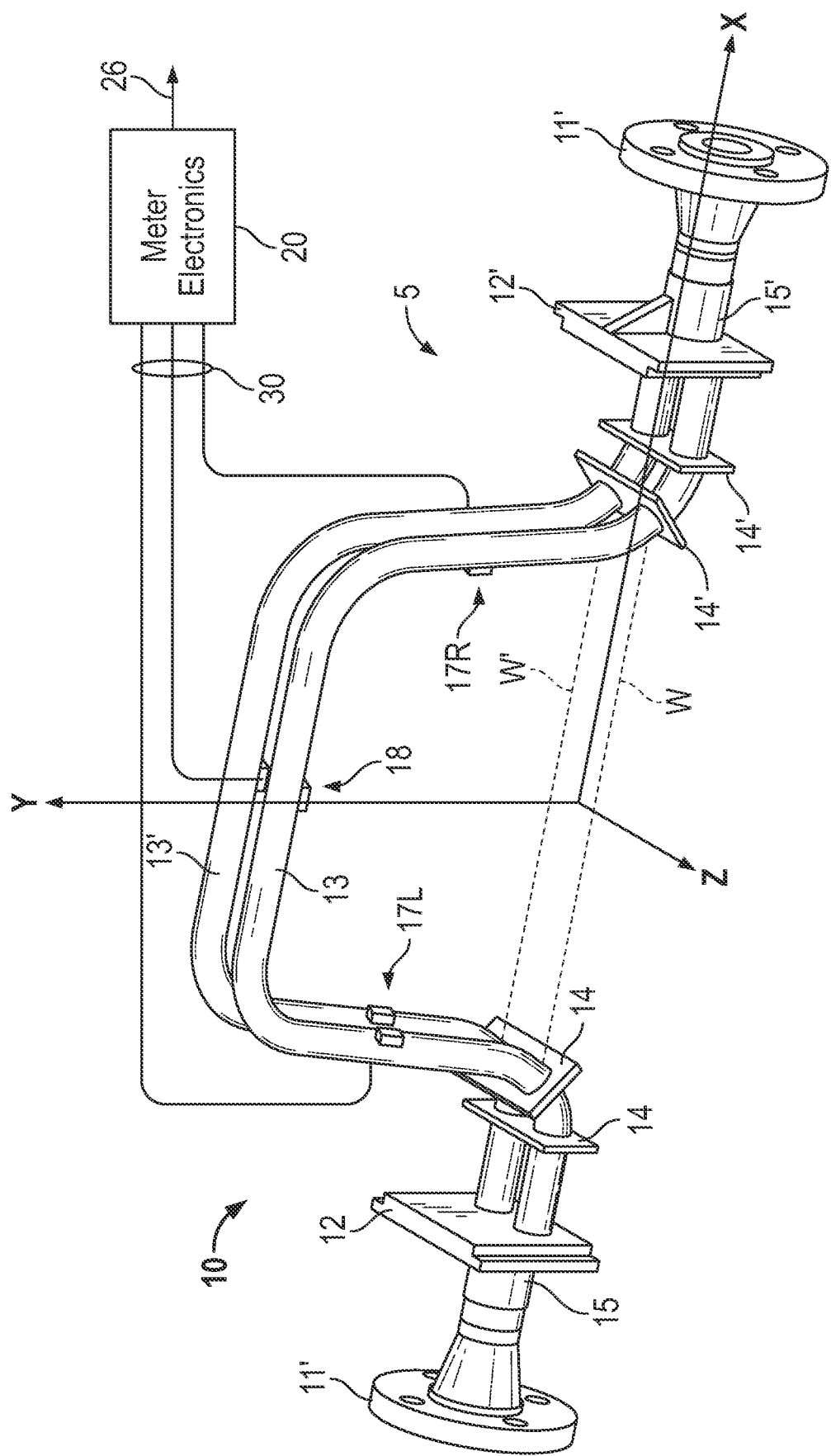
FIG. 1 illustrates a prior art flowmeter.

FIG. 1 illustrates a prior art flowmeter 5. The flowmeter 5 comprises a flowmeter assembly 10 and meter electronics 20. The meter assembly 10 responds to mass flow rate and density of a process material. Meter electronics 20 are connected to meter assembly 10 via leads 30 to provide density, mass flow rate, and temperature information over path 26, as well as other information not relevant to the present invention. Meter assembly 10 includes a pair of manifolds 15 and 15', flanges 11 and 11' having flange necks, a pair of parallel flow tubes 13 (first flow tube) and 13' (second flow tube), driver mechanism 18 such as a voice coil, temperature sensor 19, and a pair of pickoffs 17L and 17R, such as magnet/coil velocity sensors, strain gages, optical sensors, or any other pickoff type known in the art. The flow tubes 13 and 13' each converge towards flow tube mounting blocks 12 and 12'. Flow tubes 13 and 13' bend at least one symmetrical location along their length and are essentially parallel throughout their length. Brace bars 14 and 14' serve to define the axis W and W' about which each flow tube oscillates. The flow tubes 13 and 13' are fixedly attached to flow tube mounting blocks 12 and 12' and these blocks, in turn, are fixedly attached to manifolds 15 and 15'. This provides a continuous closed material path through the Coriolis meter assembly 10.

When flanges 11 and 11' are connected into a process line (not shown) which carries the process material that is being measured, material passes through an orifice in flange 11 and is conducted through manifold 15 to flow tube mounting block 12. Within manifold 15 the material is divided and routed through flow tubes 13 and 13'. Upon exiting flow tubes 13 and 13', the process material is recombined in a single stream within manifold 15' and is thereafter routed through flange 11', which is connected to the process line (not shown).

Flow tubes 13 and 13' are selected and appropriately mounted to the flow tube mounting blocks 12 and 12' so as to have substantially the same mass distribution, moments of inertia, and Young's modulus about bending axes W-W and W'-W', respectively. These bending axes go through brace bars 14 and 14'. Inasmuch as the Young's modulus of the flow tubes change with temperature, and this change affects the calculation of flow and density, a resistive temperature detector (RTD) (not shown) is mounted to flow tube 13', to continuously measure the temperature of the flow tube. The temperature of the flow tube and hence the voltage appearing across the RTD for a given current passing therethrough is governed by the temperature of the material passing through the flow tube. The temperature-dependent voltage appearing across the RTD is used in a well-known method by meter electronics 20 to compensate for the change in elastic modulus of flow tubes 13 and 13' due to any changes in flow tube temperature. The RTD is connected to meter electronics 20 by a lead.

Both flow tubes 13 and 13' are driven by driver 18 in opposite directions about their respective bending axes W and W' at what is termed the first out-of-phase bending mode of the flow meter. This driver 18 may comprise any one of many well-known arrangements, such as a magnet mounted to flow tube 13' and an opposing coil mounted to flow tube 13, through which an alternating current is passed for vibrating both flow tubes 13, 13'. A suitable drive signal is applied by meter electronics 20, via a lead, to the driver 18.

Meter electronics 20 receives the RTD temperature signal on a lead (not shown), and the left and right velocity signals through leads as well. Meter electronics 20 produce the drive signal appearing on a lead to driver 18 and vibrate tubes 13 and 13'. Meter electronics 20 process the left and right velocity signals and the RTD signal to compute the mass flow rate and the density of the material passing through meter assembly 10. This information, along with other information, is applied by meter electronics 20 over path 26 to utilization means.

Typically, Coriolis flowmeters have simple manifolds that are often multi-part assemblies. The multi-piece assemblies add weight and cost to flowmeters and also fail to prevent assembly errors and/or assembly inaccuracy. The flowmeter manifold disclosed herein provides at least an additional feature, a fluid flow area configured with a cross-sectional design that provides a hygienic manifold for a compact flowmeter. The manifold according to the present invention addresses the issue of manifold size, while simultaneously maintaining a compact design for use in a CIP system.

Figure 2A:
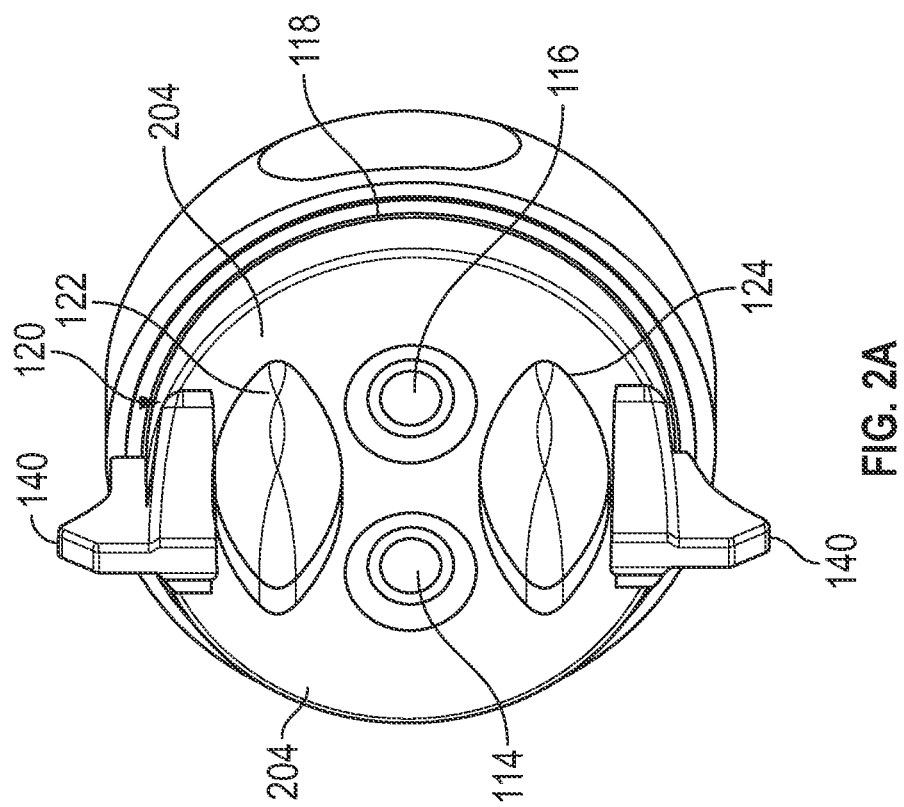
FIG. 2A illustrates a rear perspective view of the manifold of FIG. 2.
Figure 2:
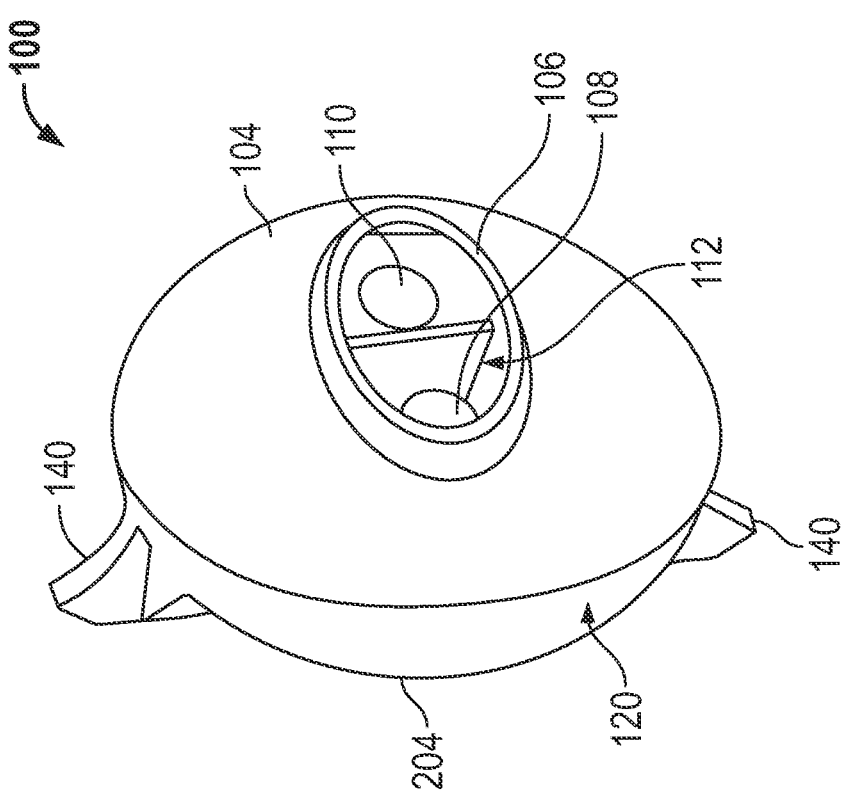
FIG. 2 illustrates a front perspective view of one embodiment of a flowmeter manifold.

FIGS. 2 and 2A illustrate an embodiment of a manifold 100 of a flowmeter 5. As shown in FIG. 2, the manifold 100 is predominantly defined by a body 120 having a first face 104 that is opposed by a second face 204. A bifurcated flow opening 112 centrally disposed on the first face includes a first orifice 108 and second orifice 110 and a raised, substantially non-circular wall portion 106 projects from the first face 104 and surrounding the first and second orifices 108, 110. As shown in FIG. 2, the wall portion 106 is substantially oval-shaped and is formed around the first and second orifices 108, 110, such that the cross section of the fluid flow exiting the manifold through the first and second orifices 108, 110 is modified (i.e., compressed) in order to increase the flow velocity.

FIG. 2A illustrates the second face 204 of the manifold 100 shown in FIG. 2. The second face 204 includes third and fourth orifices 114, 116, respectively. The third orifice 114, extends into the body 120. The second and third orifices 110, 114 both extend through the body 120 of the manifold 100 from the first and second faces 104, 204, respectively to define a first fluid flow-through passage; likewise first and fourth orifices 108, 116 extend through the body 120 of the manifold 100 from the first and second faces 104, 204, respectively, to define a second fluid flow-through passage (discussed in greater detail below with reference to FIGS. 4-4E). The third and fourth orifices 114, 116 are configured to be attached to flow tubes of a flow meter, preferably by welding, as described with reference above to the prior art.

The second face 204 of the manifold 100 includes a beveled peripheral edge 118 and peripheral flanges or wings 140 to facilitate mounting and attachment of the manifold 100 to the flowmeter case. The flanges 140 are preferably welded to the flow meter case. Further, the second face 204 may include recesses 122, 124 disposed adjacent to the third and fourth orifices 114, 116, which are formed during manufacturing for production purposes.

Figure 3:
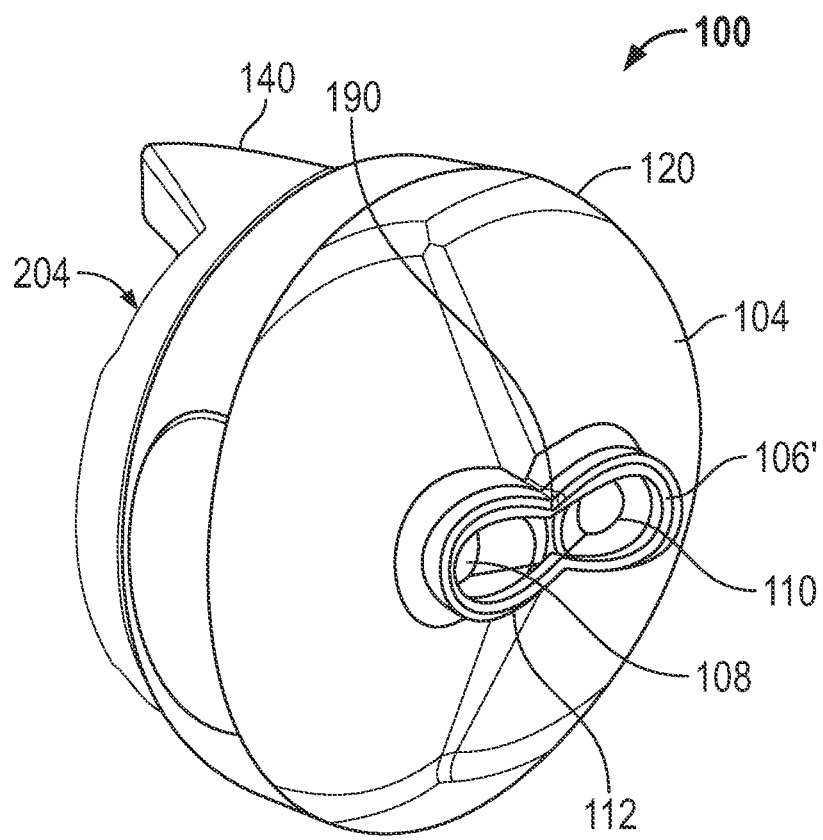
FIG. 3 illustrates a front perspective view of a further embodiment of the manifold.

FIG. 3 shows a further embodiment of the manifold 100 according to the present invention. In this embodiment, all elements and features of the manifold 100 correspond to those described above with reference to the embodiment shown in FIGS. 2 and 2A. However, in the embodiment of FIG. 3, while the wall portion 106' also has a substantially non-circular shape, here, the wall portion 106' is formed as an elongated oval with a constricted, central peripheral portion. As in the embodiment shown in FIGS. 2 and 2A, the wall portion 106 surrounds the first and second orifices 108, 110 to form a bifurcated flow opening 112. This configuration is preferred for smaller sized tubes, for example, tubes having a diameter of one-half inch that are commonly used in CIP systems.

Figure 4:
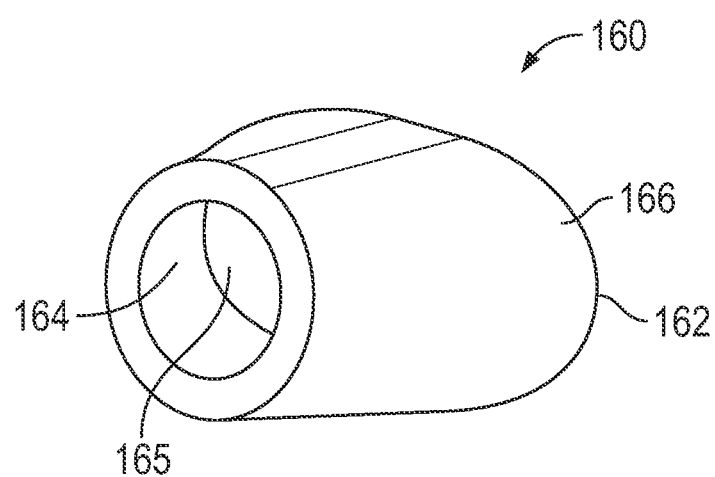
FIG. 4 illustrates a perspective view of the adapter element.
Figure 4B:
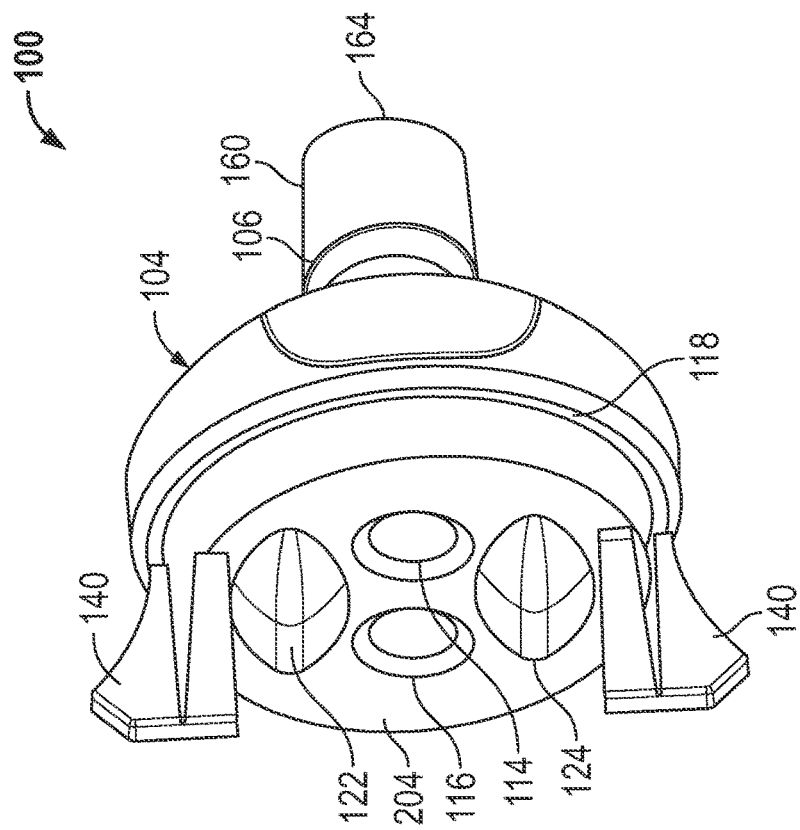
FIGS. 4A-4E illustrate front, back and side views, respectively, of the adapter element welded to the manifold and showing the flow paths through the manifold and adapter.
Figure 4A:
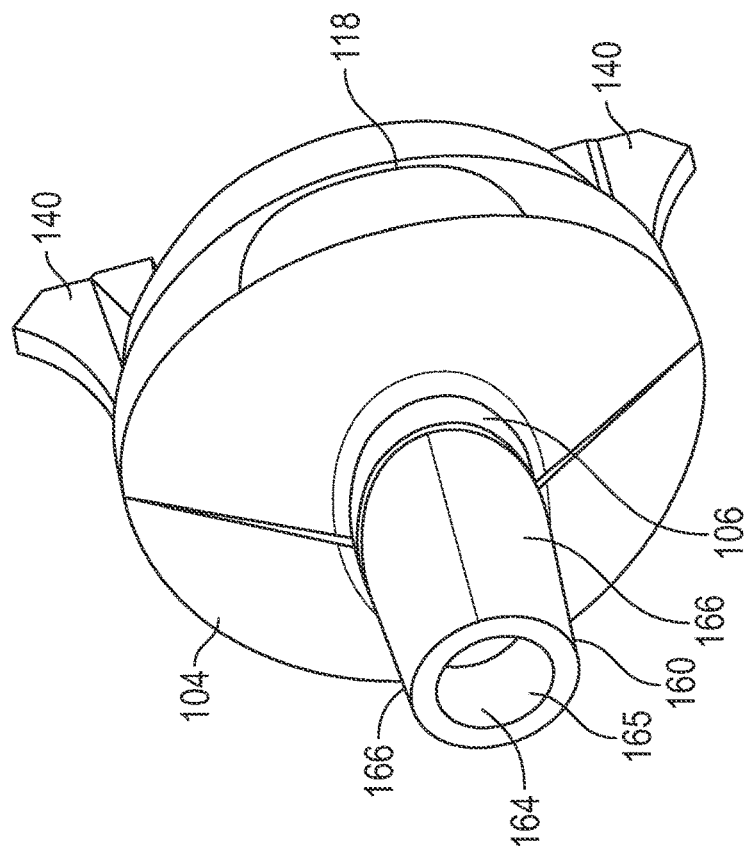
Figure 4C:
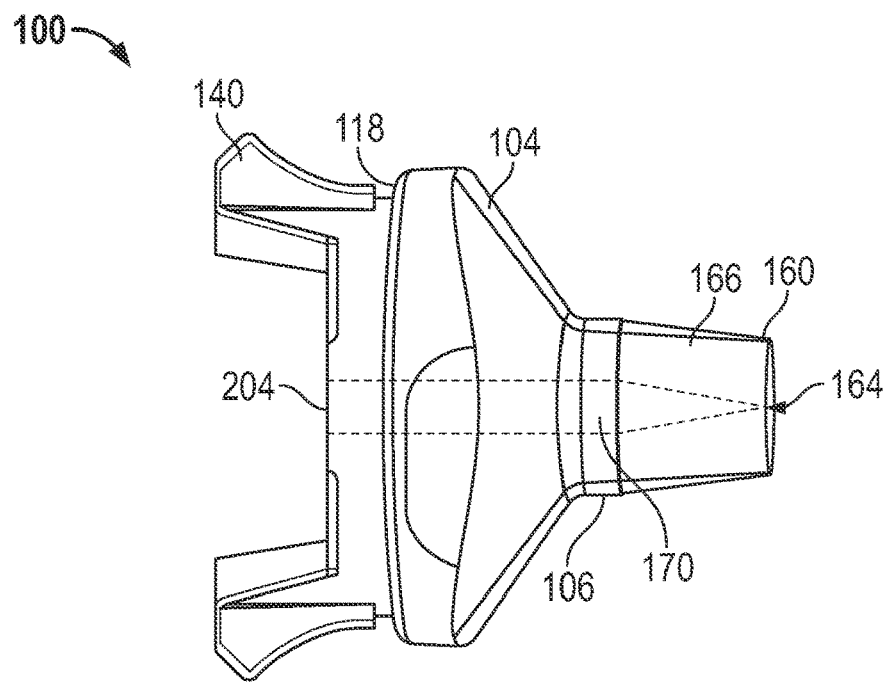
Figure 4D:
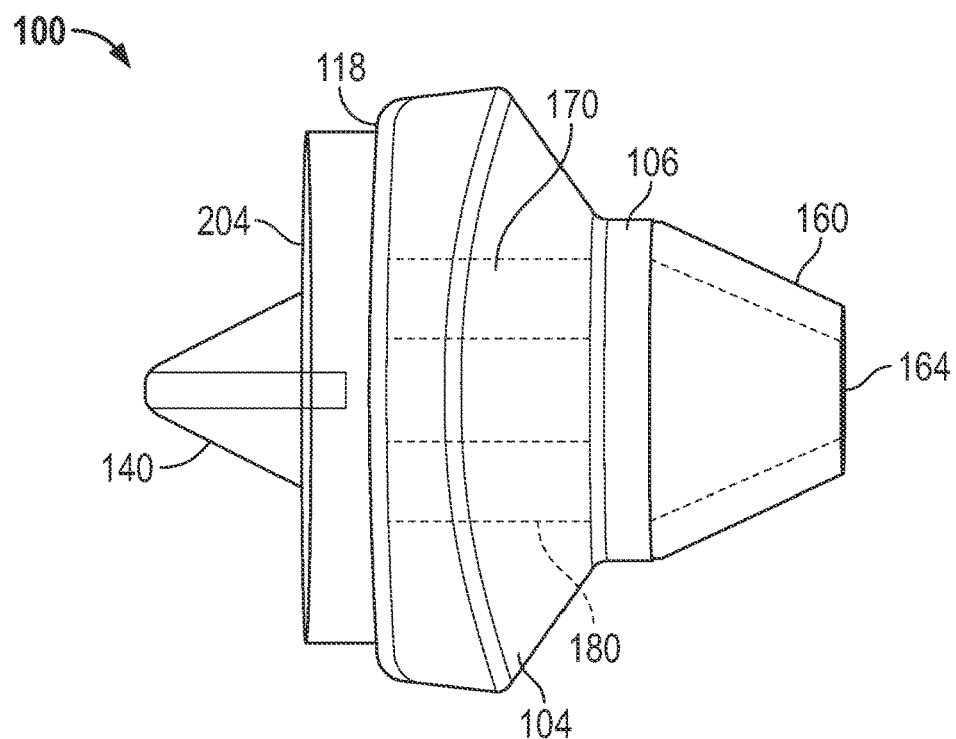

FIGS. 4 through 4D show an adapter element 160 this is attachable to the bifurcated flow opening 112 of the manifold 100. The adapter element 160 includes circumferential wall 166 which defines a flow-through passage 165 with a flow-through opening 164 and a non-circular connection face 162 for attachment to the bifurcated flow opening 112, specifically, the wall portion 106 of the manifold 100, preferably via welding. The adapter element 160 adapts the non-circular shape of the wall portion 106 to a circular face of a process connection via the circular flow-through opening 164, thereby enabling connection of the non-circular bifurcated flow opening 112 to the typically circular process connections.

FIG. 4C shows a side view of the manifold 100 with the adapter element 160 connected thereto, and further illustrates the flow path 170 passing through the body 120 of the manifold 100 and the adapter element 160, the flow path 170 shown here being formed between the first orifice 108 and third orifice 114.

Figure 4E:
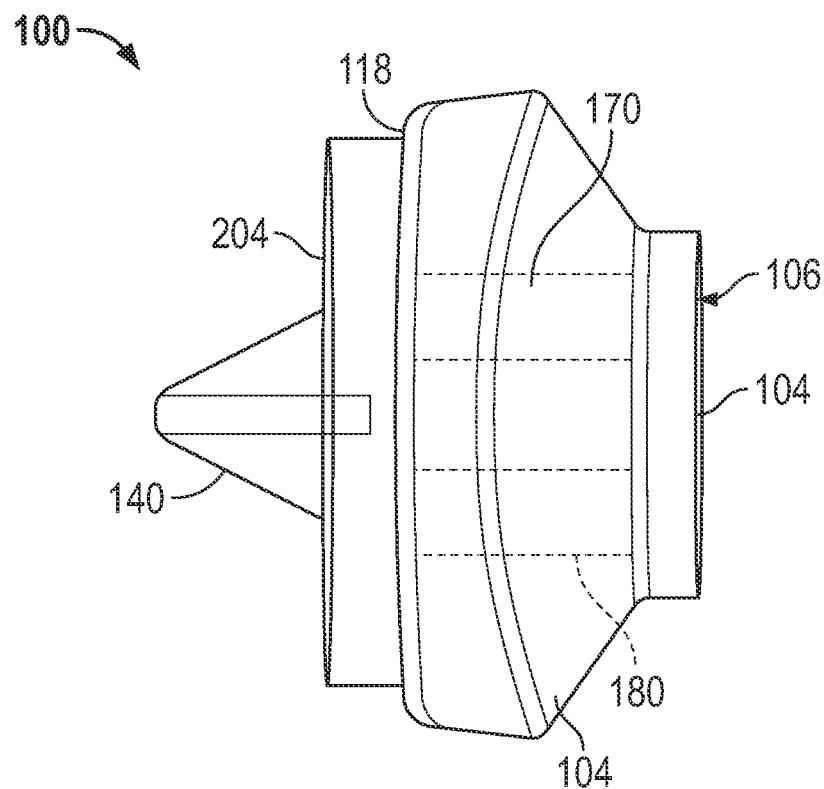

FIG. 4D shows a view of the manifold 100 and adapter element 160 rotated at 90° from the view of FIG. 4C, and indicates the second flow path 180 formed between the second orifice 110 and fourth orifice 116, as described above. FIG. 4E shows flow paths 170, 180 through manifold body 120 without the adapter element 160.

Figure 5:
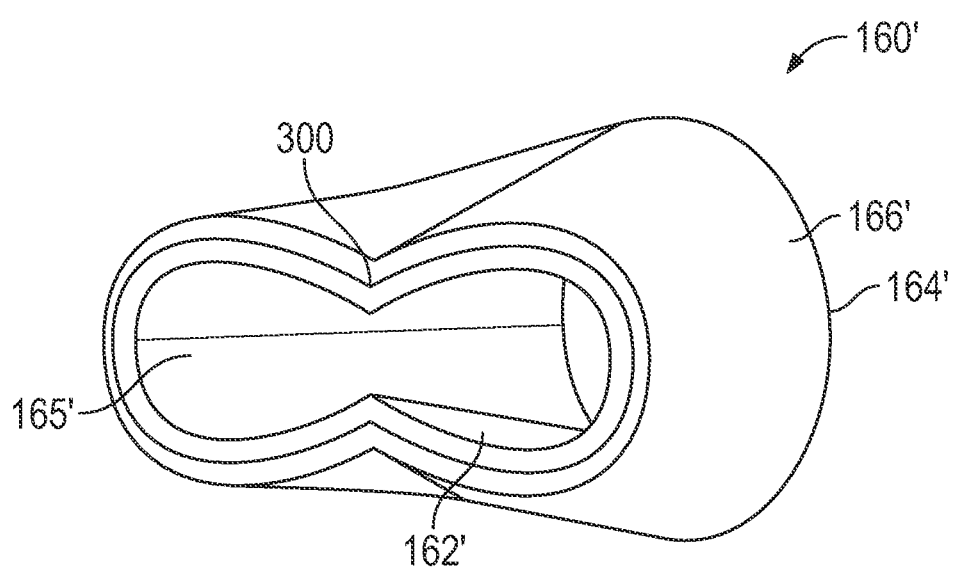
FIGS. 5-5B illustrate a further embodiment of the adapter element for use with the manifold shown in FIG. 3.
Figure 5A:
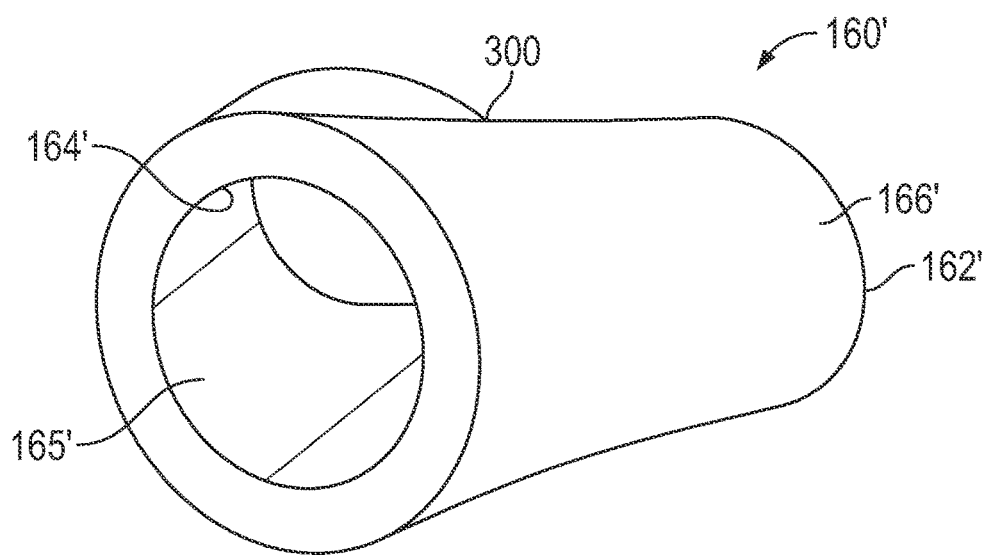

FIGS. 5 and 5A show a further embodiment of the adapter element 160', designed to be used with the manifold 100 shown in FIG. 3. As with adapter element 160, adapter element 160' is attachable to the bifurcated flow opening 112 of the manifold 100. The adapter element 160' includes circumferential wall 166' which defines a flow-through passage 165' with a flow-through opening 164' and a non-circular connection face 162' that is configured to correspond to the shape of wall portion 106', and is attached via welding. As in wall portion 106', the connection face 162' includes a peripheral constricted region 300. The adapter element 160' adapts the non-circular shape of the wall portion 106' to a circular face of a process connection via the circular flow-through opening 164', thereby enabling connection of the non-circular bifurcated flow opening 112 to the typically circular process connections.

Figure 5B:
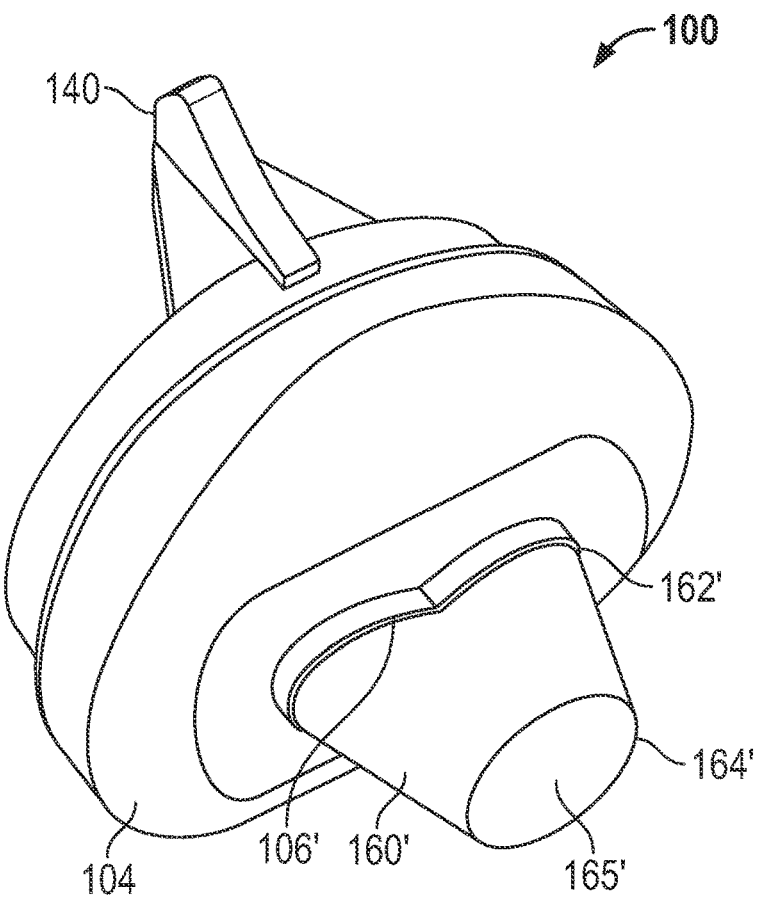

FIG. 5B shows the adapter element 160' welded to the manifold 100, in particular the wall portion 106'.

The preferred materials out of which the manifold 100 is made is metal, but ceramics, plastics, composites, and any other material known in the art is also contemplated. The preferred metals are stainless steel and titanium.

The detailed descriptions of the above embodiments are not exhaustive descriptions of all embodiments contemplated by the inventor to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and methods, and not just to the embodiments described above and shown in the accompanying figures. Accordingly, the scope of the invention should be determined from the following claims.

What is claimed is:

1. A manifold (100) of a flowmeter (5), comprising:
a body (120) having a first face (104) with a first orifice (108) and a second orifice (110) and an opposing second face (204) with a third orifice (114) and a fourth orifice (116), wherein the first orifice (108) and third orifice (114) each extend into the body (120) and meet to define a first flow path (170) traversing the body (120), and wherein the second orifice (110) and fourth orifice (116) each extend into the body (120) and meet to define a second flow path (180) traversing the body (120), wherein the third orifice (114) and fourth orifice (116) are each adapted to fluidly communicate with a first and second flow tube (13, 13') of the flowmeter (5), respectively; and
a non-circular bifurcated flow opening (112), said non-circular bifurcated flow opening (112) including a non-circular wall portion (106, 106') projecting from said first face (104) and surrounding the first orifice (108) and second orifice (110), wherein said non-circular wall portion (106, 106') is configured to change a cross section of a fluid flow path exiting said first orifice (108) and said second orifice (110).

2. The manifold (100) of claim 1, wherein the wall portion (106) has an oval cross section.

3. The manifold (100) of claim 1, wherein the wall portion (106') has an elongated oval cross section with a constricted peripheral portion (190).

4. The manifold (100) of claim 1, further comprising an adapter element (160), wherein said adapter element includes a non-circular connection face (162) and an oppositely disposed flow-through opening (164), wherein said connection face (162) is configured to be concentrically attached to wall portion (106, 106').

5. A manifold (100) of a flowmeter (5), comprising:
a body (120) having a first face (104) with a first orifice (108) and a second orifice (110) and an opposing second face (204) with a third orifice (114) and a fourth orifice (116), wherein the first orifice (108) and third orifice (114) each extend into the body (120) and meet to define a first flow path (170) traversing the body (120), and wherein the second orifice (110) and fourth orifice (116) each extend into the body (120) and meet to define a second flow path (180) traversing the body (120), wherein the third orifice (114) and fourth orifice (116) are each adapted to fluidly communicate with a first and second flow tube (13, 13') of the flowmeter (5), respectively;
a non-circular bifurcated flow opening (112), said non-circular bifurcated flow opening (112) including a non-circular wall portion (106, 106') projecting from said first face (104) and surrounding the first orifice (108) and second orifice (110), wherein said non-circular wall portion (106, 106') is configured to change a cross section of a fluid flow path exiting said first orifice (108) and said second orifice (110); and
an adapter element (160), wherein said adapter element includes a non-circular connection face (162) and an oppositely disposed flow-through opening (164), wherein said connection face (162) is configured to be concentrically attached to wall portion (106, 106').

6. The manifold (100) of claim 5, wherein, wherein the wall portion (106) has an oval cross section.

7. The manifold (100) of claim 5, wherein the wall portion (106') has an elongated oval cross section with a constricted peripheral portion (190).

8. A manifold (100) of a flowmeter (5), comprising:
a body (120) having a first face (104) with a first orifice (108) and a second orifice (110) and an opposing second face (204) with a third orifice (114) and a fourth orifice (116), wherein the first orifice (108) and third orifice (114) each extend into the body (120) and meet to define a first flow path (170) traversing the body (120), and wherein the second orifice (110) and fourth orifice (116) each extend into the body (120) and meet to define a second flow path (180) traversing the body (120), wherein the third orifice (114) and fourth orifice (116) are each adapted to fluidly communicate with a first and second flow tube (13, 13') of the flowmeter (5), respectively; and
a bifurcated flow opening (112), said bifurcated flow opening (112) including a wall portion (106') projecting from said first face (104) and surrounding the first orifice (108) and second orifice (110), wherein said wall portion (106') has an elongated oval shape with a constricted peripheral portion (190), and wherein said wall portion (106') is configured to change a cross section of a fluid flow path exiting said first orifice (108) and said second orifice (110).

9. The manifold (100) of claim 8, further comprising an adapter element (160'), wherein said adapter element (160') includes a connection face (162') having an elongated oval shape with a peripheral constricted region (300) and an oppositely disposed flow-through opening (164'), wherein said connection face (160') is configured to be concentrically attached to wall portion (106').

10. The manifold of claim 3, the constricted peripheral portion (190) being a constriction on both an interior and an exterior of the wall portion (106).

11. The manifold of claim 7, the constricted peripheral portion (190) being a constriction on both an interior and an exterior of the wall portion (106').

12. The manifold of claim 8, the constricted peripheral portion (190) being a constriction on both an interior and an exterior of the wall portion (106').

13. The manifold of claim 4, wherein the non-circular connection face (162) has at least one point with an internal cross section and an external cross section, both of the internal cross section and external cross section having a peripheral constricted region, wherein the oppositely disposed flow-through opening (164) has a circular cross section.

14. The manifold of claim 5, wherein the non-circular connection face (162) has at least one point with an internal cross section and an external cross section, both of the internal cross section and external cross section having a peripheral constricted region, wherein the oppositely disposed flow-through opening (164) has a circular cross section.

15. The manifold of claim 9, wherein the connection face (162') has at least one point with an internal cross section and an external cross section, both of the internal cross section and external cross section having a peripheral constricted region, wherein the oppositely disposed flow-through opening (164') has a circular cross section.

16. The manifold of claim 4, wherein a magnitude of a cross-sectional area of an opening of the non-circular connection face (162) is greater than, but less than double, a magnitude of a cross-sectional area of the oppositely disposed flow-through opening (164).

17. The manifold of claim 5, wherein a magnitude of a cross-sectional area of an opening of the non-circular connection face (162) is greater than, but less than double, a magnitude of a cross-sectional area of the oppositely disposed flow-through opening (164).

18. The manifold of claim 9, wherein a magnitude of a cross-sectional area of an opening of the connection face (162') is greater than, but less than double, a magnitude of a cross-sectional area of the oppositely disposed flow-through opening (164').

* * * * *